June 6, 1933. H. W. WIDENER 1,913,256
LUGGAGE CARRIER
Filed Feb. 24, 1931
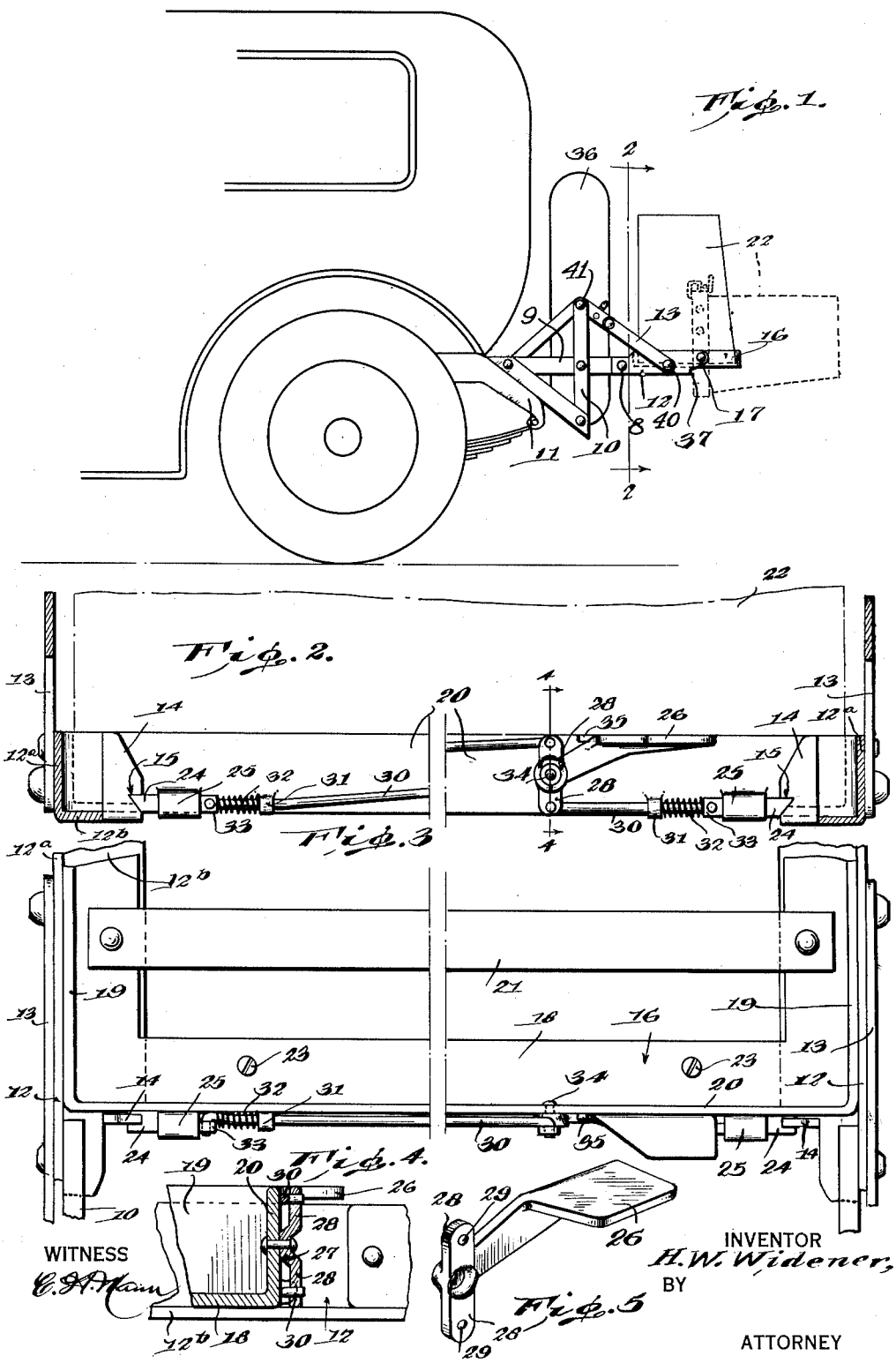
INVENTOR
H. W. Widener,
BY
ATTORNEY Patented June 6, 1933

1,913,256

UNITED STATES PATENT OFFICE

HOMER W. WIDENER, OF SKELLYTOWN, TEXAS

LUGGAGE CARRIER

Application filed February 24, 1931. Serial No. 517,927.

This invention relates to luggage carriers and constitutes an improvement on the construction disclosed in my pending application filed October 14, 1930, Serial No. 488,679, and it consists in the constructions, arrangements and combinations herein described and claimed.

It is an object of my present invention to provide a carrier adapted for the support of a trunk or the like, and includes means whereby the trunk may be swung to a position outwardly of a usual tire carrier, permitting ready removal of a spare tire therefrom.

It is a further object of the invention to provide a luggage carrier wherein the trunk support may be securely latched in operative position, as well as provide means for limiting the outward tilting movement of the trunk and support.

Another object of the invention is to provide a luggage carrier having a platform capable of being swung in either of two directions, first inwardly to an upright position when unloaded, second outwardly to an upright position when loaded.

Additional objects, advantages and features of invention will be apparent from the following description, considered in conjunction with the accompanying drawing, wherein:

Figure 1 is a fragmentary side elevation of a vehicle equipped with my invention.

Figure 2 is an enlarged view on the line 2—2 of Fig. 1.

Figure 3 is a fragmentary top plan of my carrier, with the trunk removed.

Figure 4 is a cross section on the line 4—4 of Fig. 2.

Figure 5 is a perspective view of the operating lever for manipulating the latch mechanism.

In carrying out my invention, I employ a pair of bracket structures 10 constructed in any suitable manner, but preferably in accordance with that shown and described in my pending application, Serial No. 488,-679. Each of these structures constitutes a simple truss, the chief details of which follow.

The structure 10, referring to only one is secured upon the end 11 of the chassis of a vehicle or other support, and each tie bar 9 includes an arm 12 projecting rearwardly therefrom which is suitably supported by the hinge link or brace 13 pivotally secured thereto at 40 and to an upper portion of the member at 41. The arm 12 is pivoted to the tie bar 9 at 8 and consists of angular formation, having a vertical side wall $12^a$ and horizontal base member $12^b$, and each arm is longitudinally slotted permitting bending of a portion thereof to provide upstanding latch keepers 14. The upstanding keepers 14 have notches 15 for reception of latch bolts, as will be presently described.

A rectangular platform 16 is pivotally mounted upon the arms 12 as at 17, (see Fig. 1). The platform 16 is preferably formed from angle iron bent to shape and providing a horizontal base flange 18 extending entirely around the inner ends and sides of the frame and vertical end and side walls 19 and 20, respectively. Cross slats 21 are riveted to the end flanges 18, as shown, to form a supporting surface for a luggage trunk or the like.

Within the platform 16 there is disposed a luggage trunk 22 of a size to be received within the upstanding walls 19 and 20 and the horizontal flange 18 is suitably apertured for reception of bolts 23 projected through the bottom of the trunk to securely hold the trunk upon the frame. The above described construction permits the swinging of the platform 16 and trunk 22 as an entirety. When the platform is empty it may be swung inwardly to an upright position on the pivots 8, and when loaded may be swung outwardly to an upright position so as to make the spare tire easily accessible.

Attention is now directed to Figures 1 and 4 of the drawing wherein it will be seen that when the platform 16 is in its horizontal position, one wall 20 is disposed closely adjacent and parallel with the upstanding latch keepers 14, and this is made so in order that the latch bolts 24, which are carried by the upstanding flange 20, may be in position to engage the notches 15.

As shown in Figs. 3 and 4, the latch bolts 24 are disposed at opposite sides of the platform 16, the bolts being slidable through sleeves 25 and are simultaneously retractable by manipulation of a lever 26, as will now be described.

The lever 26 has a hub portion 27 from opposite sides of which there are extended short arms 28, suitably apertured as at 29, in which respective links 30 are pivoted. Each link 30 is slidably supported in bearings 31 upon the platform, their ends being secured to respective latch bolts 24. Coiled tension springs 32 are disposed around each link and between a shoulder 33 of the latch bolt and the bearing 31.

The lever 26 is pivotally mounted upon the flange 20 by a pivot pin 34 as shown, and this pivot of the lever is preferably arranged adjacent one end of the frame 16 so that the latch may be operated without liability of soiling the clothing, as would be the case if the latch were disposed at the middle portion of the frame.

A lug 35 formed integrally with the flange 20 and in the upward path of the lever 26 limits upward movement of the lever.

The operation will be readily understood from a consideration of the following description thereof. When occasion necessitates the removal of the spare tire, indicated by the reference character 36, the lever 26 is given a downward movement, which movement will swing the arms 28 in opposite directions exerting a pull upon the links 30. Since the links 30 are connected to the latch bolts 24 the bolts will be retracted, and consequently disengage the notches 15. Retraction of the bolts 24 will compress the springs 32 as will be apparent. With the bolts 24 disengaged the frame 16 is swung outwardly upon the pivotal mount 17, and since the trunk is secured to the frame it will also be swung outwardly as indicated in dotted lines in Fig. 1, independently of the sustaining truss structure in which the arm 12 is included. In the absence of the trunk 22 the platform 16 and the arms 12 may be swung in entirely with respect to the remaining truss structure.

It will be noted that the platform 16 when swung to dispose the trunk outwardly of the supporting brackets 10 will engage the ends of the arms 12 as at 37 and prevent further outward swinging movement of the platform and trunk. To return the frame and trunk to their normal positions, it is only necessary to swing the trunk upwardly and allow the trunk to settle by gravity upon the flanges 12ᵇ. The bolts 24 will automatically engage the notches 15 and securely lock the frame 16 in place.

While I have shown and described a preferred construction, it should be understood that I do not confine myself to the exact construction shown, and reserve as my own, all such modifications as fairly fall within the scope of the appended claims.

What is claimed is:

1. In a luggage carrier, a pair of bracket structures attachable to a support, each having an arm angled in cross section and including a base member, said arms being pivotally connected in said bracket structures, a platform pivotally mounted upon and between said arms and adapted to rest upon said base members, portions of said base members being formed into latch keepers, and latch means carried by said platform and cooperating with said latch keepers to retain said platform against pivotal movement with respect to the arms.

2. A luggage carrier comprising a platform, a truss for sustaining the platform, said truss including a tie bar a portion of which is pivotally jointed to provide an arm, said truss also including a hinge link having a pivotal connection at one end with said arm, a pivotal mount for the platform on said arm enabling swinging of the platform with respect to said arm and independently of the truss, and latch means for disengageably connecting the platform to said arm.

3. A luggage carrier comprising a platform, a truss for sustaining the platform, said truss including a tie bar a portion of which is pivotally jointed to provide an arm said truss also including a hinge link having a pivotal connection at one end with said arm, a pivotal mount for the platform on said arm enabling swinging of the platform with respect to said arm and independently of the truss, latch means for disengageably connecting the platform to said arm, and means for limiting the swinging of the platform including a recess in said arm to receive a portion of the platform.

4. A luggage carrier comprising a platform, and means for attaching the platform to a support and enabling swinging the platform into either of two upright positions first near the support when empty and away from the support when loaded, said means comprising a truss secured to the support, said truss including a king post member, a tie bar having a pivoted arm and a jointed brace having its free ends pivoted to the king post member and to the arm, and a pivotal mount by which the platform is connected with the arm.

HOMER. W. WIDENER.